United States Patent [19]

Nakano

[11] Patent Number: 4,564,923
[45] Date of Patent: Jan. 14, 1986

[54] INTERCONNECTABLE ELECTRONIC GAME APPARATUS

[75] Inventor: Harumi Nakano, Tokyo, Japan

[73] Assignee: Casio Computer Co., Ltd., Tokyo, Japan

[21] Appl. No.: 315,232

[22] Filed: Oct. 26, 1981

[30] Foreign Application Priority Data

Jul. 20, 1981 [JP] Japan .................................. 56-113274

[51] Int. Cl.[4] .............................................. G06F 9/00
[52] U.S. Cl. .................................. 364/900; 273/85 G
[58] Field of Search ... 364/200 MS File, 900 MS File, 364/410; 273/143 R, 85 G, 313, 86 R

[56] References Cited

U.S. PATENT DOCUMENTS

| 4,208,715 | 6/1980 | Kumahara | 364/200 |
| 4,296,476 | 10/1981 | Mayer | 364/900 |
| 4,372,558 | 2/1983 | Shimamoto | 273/238 |

FOREIGN PATENT DOCUMENTS

| 1956225 | 5/1971 | Fed. Rep. of Germany . | |
| 1488654 | 10/1977 | United Kingdom | 273/237 |

OTHER PUBLICATIONS

"Computer Dictionary and Handbook", Charles Sippl, p. 371—1972.
Wasserman, K. and Tim Stryker, *Multimachine Games*, Byte, Dec. 1980, pp. 24–80.
Clarke, Sheila, *A Pet For Every Home*, Kilobaud Microcomputing, May 1978, pp. 40–42.
DeJong, Marvin L., Programming & Interfacing the 6502, With Experiments, 1980, pp. 9–25, 51–59, 283–289.
Boswell, F. D. et al., System Overview: Commodore Super PET, 1981, pp. 7–17.
Motorola, 8-Bit Microprocessor & Peripheral Data, 1981, 1983, pp. 3-307-3-316.
"Anwendung von Mikroprozessoren in Systemem aus Mehreren Prozessoren", Nachrichtentechnik—28, (1978), pp. 488-491—Heft 12.
Advanced Micro Devices; The 8080A/9080A MOS Microprocessor Handbook, pp. 2-1-2-16.

Primary Examiner—Gareth D. Shaw
Assistant Examiner—John G. Mills
Attorney, Agent, or Firm—Frishauf, Holtz, Goodman & Woodward

[57] ABSTRACT

Electronic game apparatus which is interconnectable with other like game apparatus to enable two or more players to participate with their own apparatus, includes a keyboard section and a memory for storing a game program. Processing circuitry operates continuously to decode and implement the game program, according to data entered by the keyboard section. The processing circuitry also controls operations in the other like electronic game apparatus, when the apparatus is linked with such other apparatus through interconnect circuitry forming a part of the apparatus.

1 Claim, 11 Drawing Figures

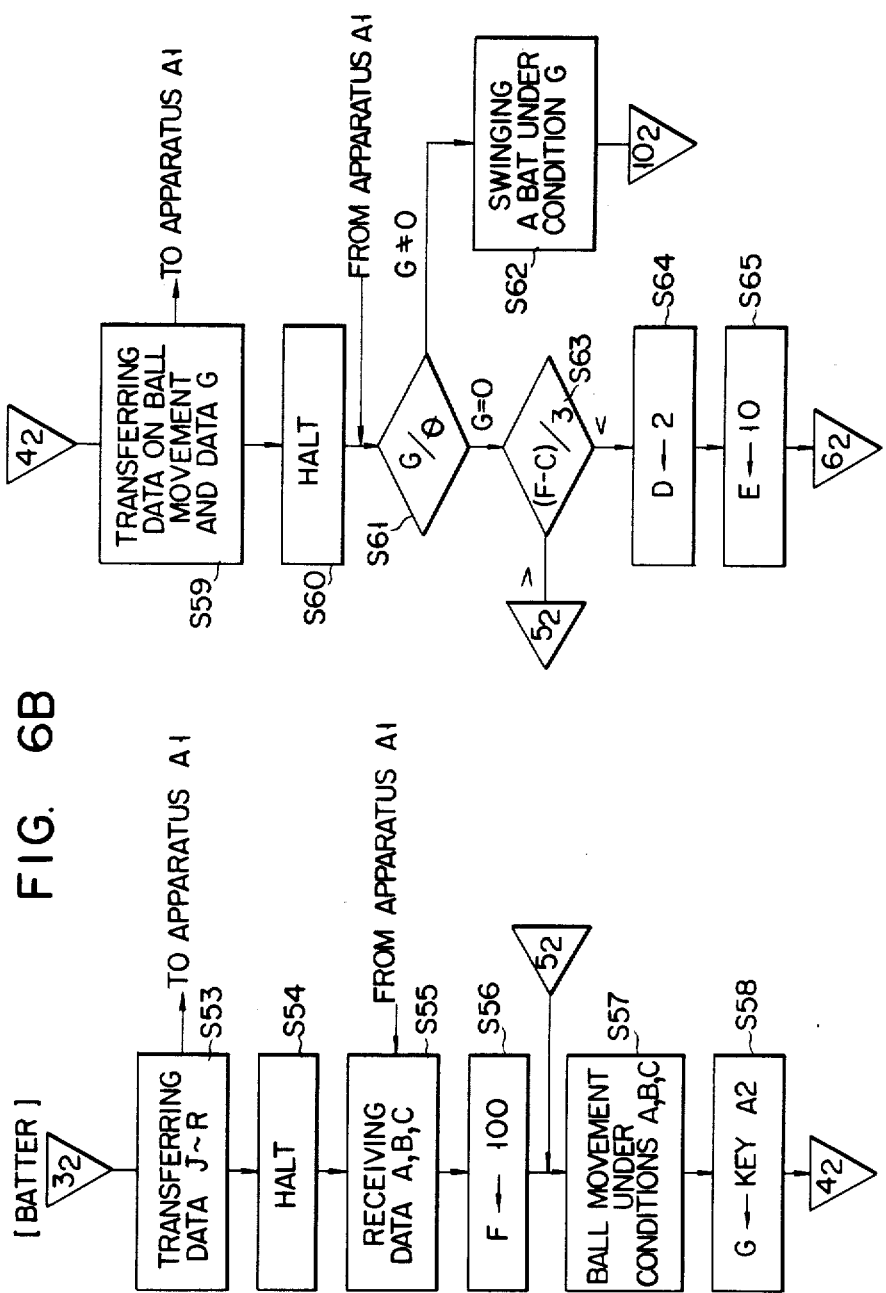

INTERCONNECTABLE ELECTRONIC GAME APPARATUS

BACKGROUND OF THE INVENTION

The present invention relates to electronic game apparatus and more particularly to electronic game apparatus capable of being linked with other like game apparatus.

Programmable electronic game apparatus have been available which have the function of storing a program on a magnetic tape, for example, and this enables the apparatus to store a fairly long program. Naturally, even such apparatus cannot store a program which exceeds its memory capacity including that of its magnetic tape, though being able to store data in the magnetic tape. Therefore, such electronic game apparatus also has a drawback of being unable to use a long program which executes such complicated jobs as to need more memory capacity than that of the electronic game apparatus. In addition, even when a long program is made within the memory capacity of such an apparatus, the program cannot be obtained by combining sections of program which have been separately made with the another like apparatus. Thus making a long program required a lot of labor and time.

Further, when the conventional electronic game apparatus are applied to electronic game machines which contain game programs in it and need two or more players to play, each player has to operate the game machine by turns, discouraging enjoyment of the game.

SUMMARY OF THE INVENTION

The object of the present invention is accordingly to provide electronic game apparatus having a linking function to share programs with one or more other like programmable electronic game apparatus, by connecting each apparatus to one another.

This object has been attained by electronic game apparatus which comprises: input means for inputting data; memory means for storing a program including at least first and second instructions and data inputted from said input means, said first instruction being for skipping from a program of said apparatus to a program of a second similar apparatus for processing and said second instruction being for returning control to said second apparatus which designates the program of said apparatus; data processing means for sequentially reading out and executing, the instructions stored in said memory means and for sending out a control signal and necessary data, for switching said second apparatus from an inoperative state to an operative state and said apparatus from an operative state to an inoperative state when said first and second instructions are executed; linking means connected to send out a control signal and data from said data processing means to said second apparatus and receive a control signal and data from said second apparatus; and control means for switching said apparatus from the inoperative state to the operative state by the control signal obtained from said second apparatus through said linking means and said apparatus from the operative state to the inoperative state by the control signal from said data processing means, and for sending out control signals to said respective means.

In this way, according to the present invention, programs each of which is respectively stored in one of a plurality of electronic game apparatus with a linking function can be shared by connecting these apparatus. Therefore, the usable program capacity of one of the apparatus thus connected can be increased up to the total capacity of all the apparatus connected. Further, when a long program is to be prepared, programming time can be reduced because the long program can be made by combining partial program each of which are contained in one of the electronic game apparatus, respectively. Further, when the present invention is applied to a game, a plurality of players can play the game while each player is operating his own apparatus to which the other players' apparatus are connected, in contrast to the conventional apparatus. The apparatus according to this invention are convenient to play with, thus adding more playing fun.

BRIEF DESCRIPTION OF THE DRAWINGS

FIGS. 6A to 6F are flowcharts of processings when the embodiment is applied to a baseball game.

DETAILED DESCRIPTION OF THE PREFERRED EMBODIMENTS

Figure 1:
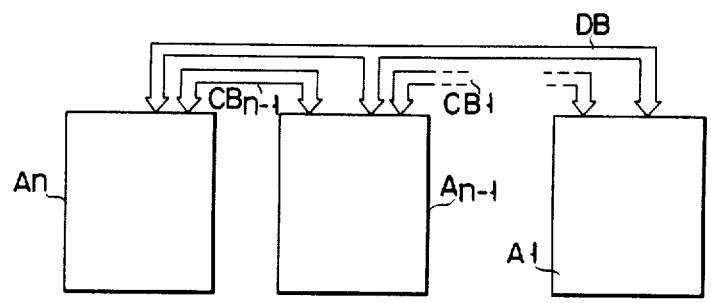
FIG. 1 is a diagram schematically showing the connections between electronic game apparatus A1 to An embodying the present invention.

FIG. 1 is a schematic block diagram showing the connections between electronic game apparatus, A1 to An (n units of apparatus), of the present invention. A data bus DB is commonly connected to apparatus A1 to An and control buses CB1 to $CB_{n-1}$ are connected between adjacent apparatus such as A1 and A2, A2 and A3.

Figure 2:
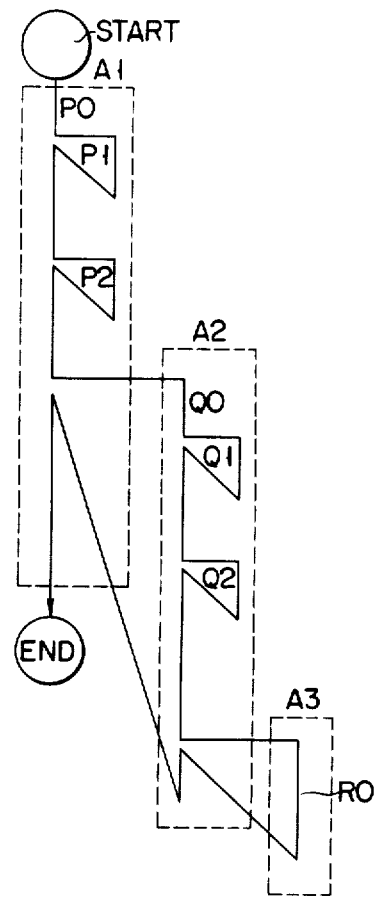
FIG. 2 is a diagram showing a flow of processings when a single program is executed by a combination of the apparatus A1, A2, and A3, which are taken as an example from the apparatus A1 to An shown in FIG. 1.

FIG. 2 shows a flow of processings when a single program is executed by using apparatus A1, A2, and A3 taken as an example from apparatus A1 to An shown in FIG. 1. After the routines P0, P1, and P2 of the apparatus A1 are finished, the processings in the apparatus A2 are started. Then, after the routines Q0, Q1, and Q2 of the apparatus A2 are finished, the processings in the apparatus A3 are started. After the routine R0 of the apparatus A3 is completed, the flow goes back to the processings of the apparatus A1 through those of the apparatus A2 and the processings of the single program is completed.

Figure 3:
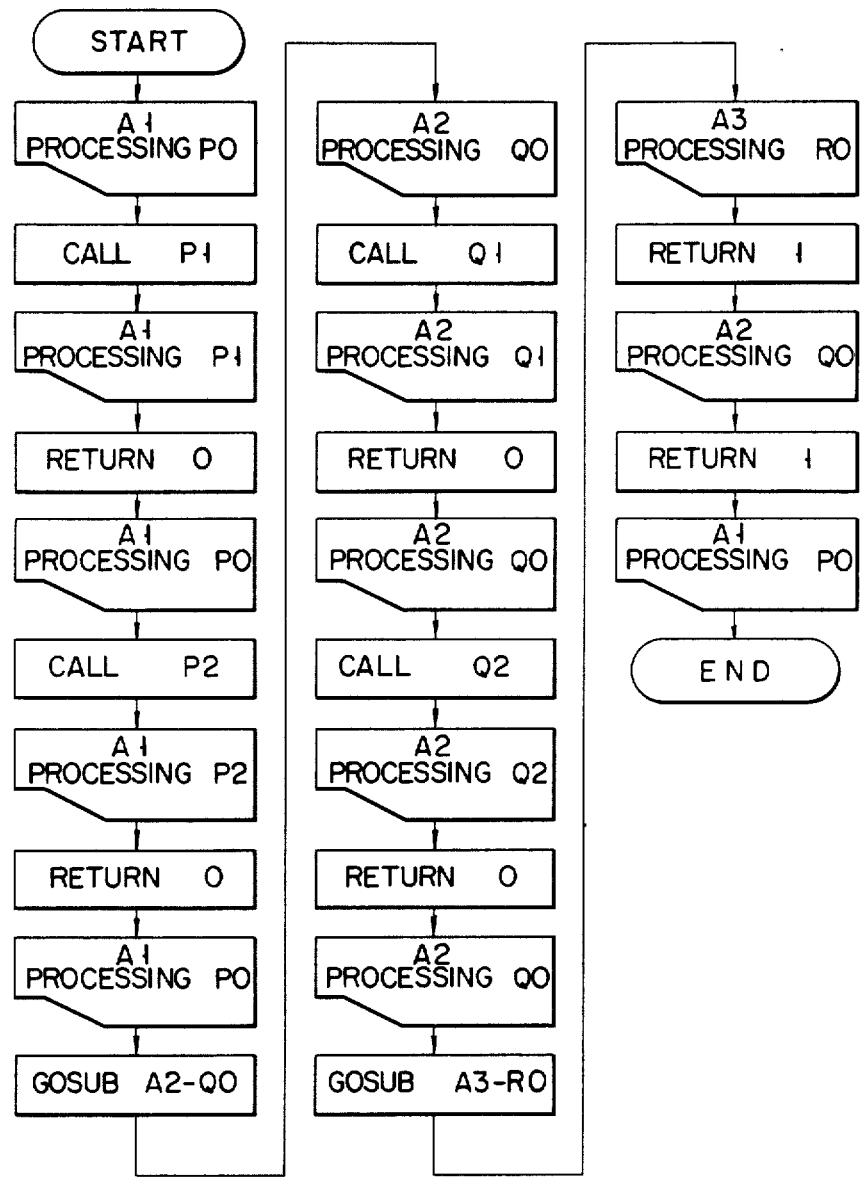
FIG. 3 is a flowchart showing in more detail the flow of processings of the apparatus A1, A2, and A3 shown in FIG. 2.

FIG. 3 is a flowchart showing in detail the flow of processings of the apparatus A1, A2 and A3 in FIG. 2. A [Call] is an instruction to jump the processing to a subroutine in the immediate apparatus, a [Return 0] is a return instruction corresponding to the instruction [Call]; a [Gosub] is an instruction to jump the processing to a subroutine in another apparatus; and a [Return 1] is a return instruction corresponding to the instruction [Gosub].

The electronic game apparatus A1 executes the main routine P0 (step S11) when receiving the start instruction of a program. Then the subroutine P1 is called (step S12) and then executed (step S13). After the processing of the subroutine P1 is completed, the return instruction to return the processing to the main program P0 is executed (step S14). Then, the main program P0 is executed again (step S15). At step S16, the subroutine P2 is called and executed (step S17). After the processing of the subroutine P2 is finished, the return instruction to return the flow to the main program is executed (step S18), and thus the main program P0 is executed again (step S19). Then, the main program Q0 of the apparatus A2 is called (step S20). All the processing mentioned above are performed by the apparatus A1.

When the main program Q0 of the apparatus A2 is called, processings similar to those of the apparatus A1 are performed by the apparatus A2 according to steps S21 to S29, and then the main program R0 of the apparatus A3 is called (step S30).

The main program R0 is executed (step S31), and when this processing is completed, the return instruction is executed (step S32) to return the flow to the main program Q0 of the apparatus A2. As a result, the processing of the main program of the apparatus A2 is executed (step S33), and after this process is completed, the return instruction is executed (step S34) to return the processing to the main program P0 of the apparatus A1. Then, when the main program P0 is finished, all the program processings in the apparatus A1, A2, and A3 are completed.

Figure 4:
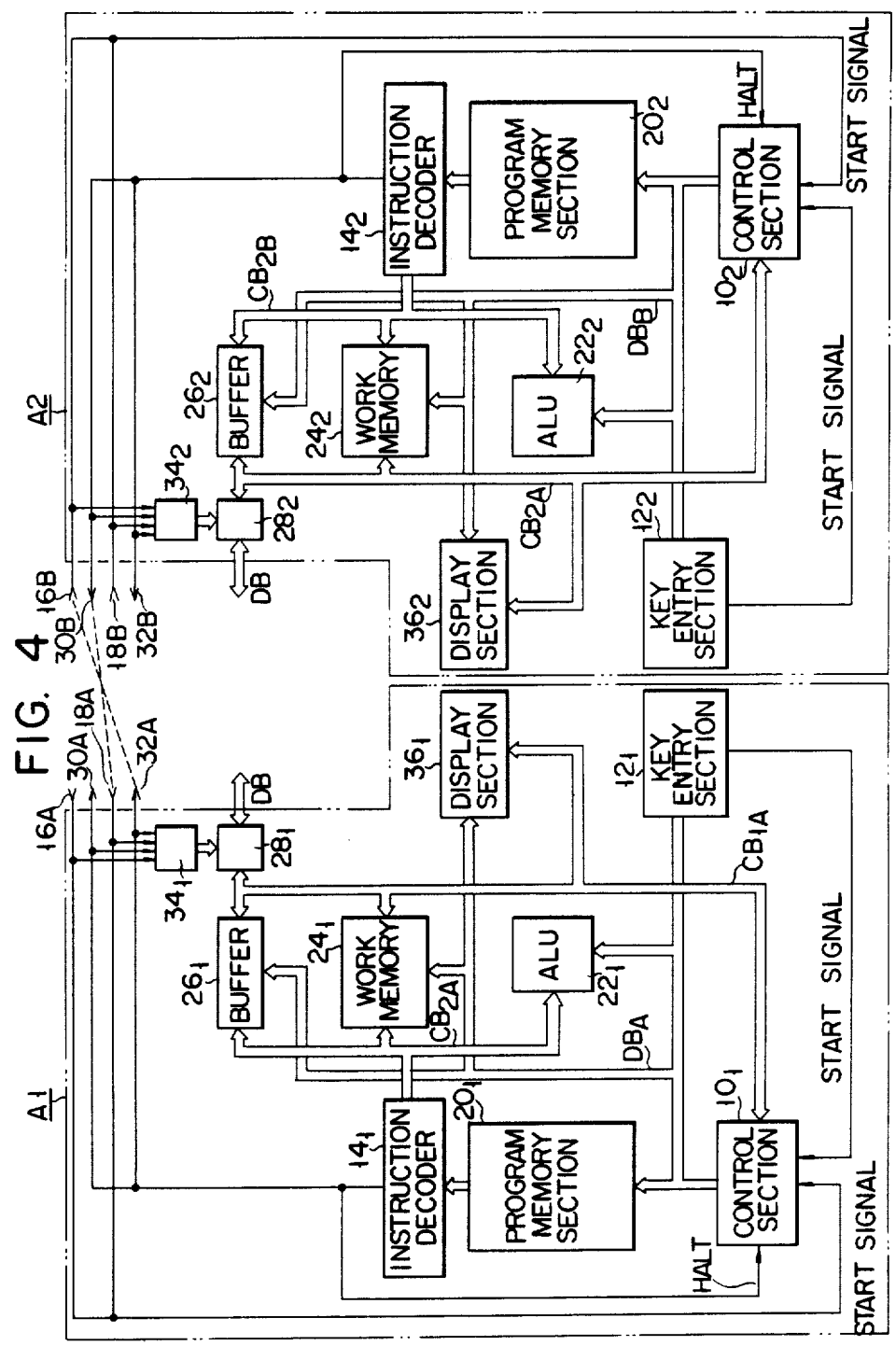
FIG. 4 is a schematic block diagram showing the system configuration of the apparatus A1 and A2 among the electronic game apparatus A1 to An shown in FIG. 1.

FIG. 4 shows system configurations of the apparatus A1 and A2, taken as an example from electronic game apparatus A1 to An shown in FIG. 1. A control section $10_1$ of the apparatus A1 controls the entire system of the apparatus A1. Applied to control section $10_1$ are the key operation signal (including the start signal) from a key entry section $12_1$, the HALT signal from an instruction decoder $14_1$, the start signal through the signal lines 16A and 18A, and the address signal through the control bus $CB_{1A}$. The control section $10_1$ outputs the address signal to a program memory section $20_1$ which stores programs. The control section $10_1$ is connected to the program memory section $20_1$, an ALU (arithmetic logic unit) $22_1$, a work memory $24_1$, and a buffer $26_1$ through the data bus $DB_A$ and also to a 3-state buffer $28_1$ through the control bus $CB_{1A}$.

The instruction decoder $14_1$ reads out and decodes various programs stored in the program memory section $20_1$. The instruction decoder $14_1$ is connected to the ALU $22_1$, work memory $24_1$, and buffer $26_1$ through the control bus $CB_{2A}$ through which control signals are applied. The instruction decoder $14_1$, when decoding the [Gosub] instruction to jump the processing to a program in another electronic game apparatus, outputs the HALT signal to the control section $10_1$, and also a logical "1" signal to the signal lines 30A and 32A.

The work memory $24_1$ stores data such as data on addresses, and more particularly for a baseball game, data on various parameters for pitching and hitting.

An input/output mode switch $34_1$ is connected to the signal lines 16A, 18A, 30A, and 32A through which each signal is supplied. The input/output mode switch $34_1$ sends out the control signal to the 3-state buffer $28_1$. The data transfer between the apparatus A1 and A2 is made through the buffer $28_1$ and data bus DB.

The key entry section $12_1$ is connected to the program memory section $20_1$ and work memory $24_1$ through the data bus $DB_A$ through which data is supplied to each device.

A display section $36_1$ is connected to the data bus $DB_A$ and control bus $CB_{1A}$ and makes various displays. This display section $36_1$ consists of a liquid crystal display device, for example. Display section $36_1$ displays movements of a ball and a bat, for example, in a baseball game.

The system configuration of the other electronic game apparatus A2 is the same as that of the game apparatus A1, and therefore its description will be omitted.

When being linked, the apparatus A1 and A2 are connected by connecting the data buses DB of apparatus A1 and A2 to each other; the signal line 18A of the apparatus A1 to the signal line 30B of the apparatus A2; and the signal line 32A of the apparatus A1 to the signal line 16B of the apparatus A2. The signal lines 16A and 30A of the apparatus A1 and the signal lines 18B and 32B of the apparatus A2 are used to connect other apparatus which are not shown.

Now the operation of the embodiment of the abovedescribed configuration will be described. First, when the start signal is applied from the key entry section $12_1$ of the apparatus A1 to its control section $10_1$, the control section 10, $10_1$ outputs the leading address of the program prestored in the program memory section $20_1$. Then the program stored in the locations corresponding the addresses specified by the control section $10_1$ is read out into the instruction decoder $14_1$ to be decoded. As a result, control instructions are output from the instruction decoder $14_1$ to the ALU $22_1$, work memory $24_1$, and buffer $26_1$, and various arithmetic operations are performed.

When the [Gosub] instruction is sent out from the program memory $20_1$ to the instruction decoder $14_1$, the [Gosub] instruction is decoded by the instruction decoder $14_1$. As a result, a 1 signal is output on the signal line 32A, signifying that the operation is transferred to the apparatus A2. At the same time, control instructions are issued to the ALU $22_1$, work memory $24_1$, and buffer $26_1$. Then a fixed number of data in a predetermined format, for example, an address of the program memory section $20_2$ of the apparatus A2 is transferred to the buffer $26_1$. Further, the input/output mode switch $34_1$, when receiving the signal on the signal line 32A, then switches 3-state buffer $28_1$ into the transmission mode. Thus the data sent out to the buffer $26_1$ is transferred to the apparatus A2 through the 3-state buffer $28_1$ and data bus DB. As described above, after the subroutine jump instruction [Gosub] is executed, the subroutine name and common data are transferred to the apparatus A2 through the data bus. When only two such electronic game apparatus are used, the processing can be jumped to the subroutine of the other apparatus by merely giving the instruction [Gosub] without specifying the subroutine name. If the signal lines 16A and 30A are connected to other apparatus, the subroutine name and common data are also transferred to the other apparatus. These apparatus search if they have the specified subroutine program, and the apparatus having the specified subroutine starts to execute the program.

When the data transfer is completed, the control section $10_1$ goes into a halt state by receiving a HALT signal issued from the instruction decoder $14_1$ thereto. This state continues until a "1" signal appears on the signal line 18A.

On the other hand, when a "1" signal appears on the signal line 16B of the apparatus A2, the control section $10_2$, which has therefore been kept in a halt state, is brought from a halt state to an operative state. The "1" signal appearing on the signal line 16B makes the input/output switch $34_2$ operative, and the 3-state buffer $28_2$ is switched to the receiving condition.

The 3-state buffer $28_2$ then sequentially transfers the data sent from the 3-state buffer $28_1$ to the buffer $26_2$ through the data bus DB. Then, when being brought from a halt state to an operative state, the control section $10_2$ of the apparatus A2 reads out and inputs the data stored in a specified area of the buffer $26_2$ as a start address of the program memory section $20_2$. When the subroutine specified by the apparatus A1 exists in the program memory section $20_2$, the prestored subroutine program is sequentially read out into the instruction decoder $14_2$ to be decoded.

Then control instructions are output from the instruction decoder $14_2$ to the ALU $22_2$, work memory $24_2$, and buffer $26_2$ by which various operations are performed. When the subroutine specified by the apparatus A1 does not exist in the apparatus A2, the apparatus A2 is brought to a halt state again.

After the arithmetic operations in the apparatus A2 are completed, the instruction [Return] is output from the program memory section $20_2$ to the instruction decoder $14_2$ to be decoded. As a result, the necessary data are transferred from the work memory $24_2$ to the buffer $26_2$.

Then a "1" signal is output on the signal line 30B from the instruction decoder $14_2$, indicating to the apparatus A1 that the operations in the apparatus A2 are completed. At the same time, the "1" signal makes the input/output mode switch $34_2$ operative, which brings the 3-state buffer $28_2$ to a transmission mode, starting the transfer of the contents in the buffer $26_2$.

On the side of the apparatus A1, when a "1" signal appears on the signal line 18A, the control section is brought from a halt state to an operative state. Further, the "1" signal on the signal line 18A makes the input/output mode switch $34_1$ operative, switching the 3-state buffer $28_1$ to the receiving mode. As a result, the buffer $26_1$ receives all the data sent from the buffer $26_2$. When being brought from a halt state to an operative state, the control section $10_1$ sends to the program memory section $20_1$ an address next to the address corresponding to the memory area in which the [Gosub] instruction is stored, and restarts the processing of the specified program therein.

As described above, the apparatus A1 can use the program in the apparatus A2 and the apparatus A2 can use the program in the apparatus A1. Therefore, according to the embodiment of the present invention, usable program capacity can be increased to the total memory capacity of all the apparatus connected.

Now there will be explained an example of the embodiment mentioned above being applied to a baseball game. As a baseball game is played between the bat side and the field side, two electronic game apparatus A1 and A2 are connected as shown in FIG. 4: one apparatus for the bat side and the other for the field side.

Figure 5:
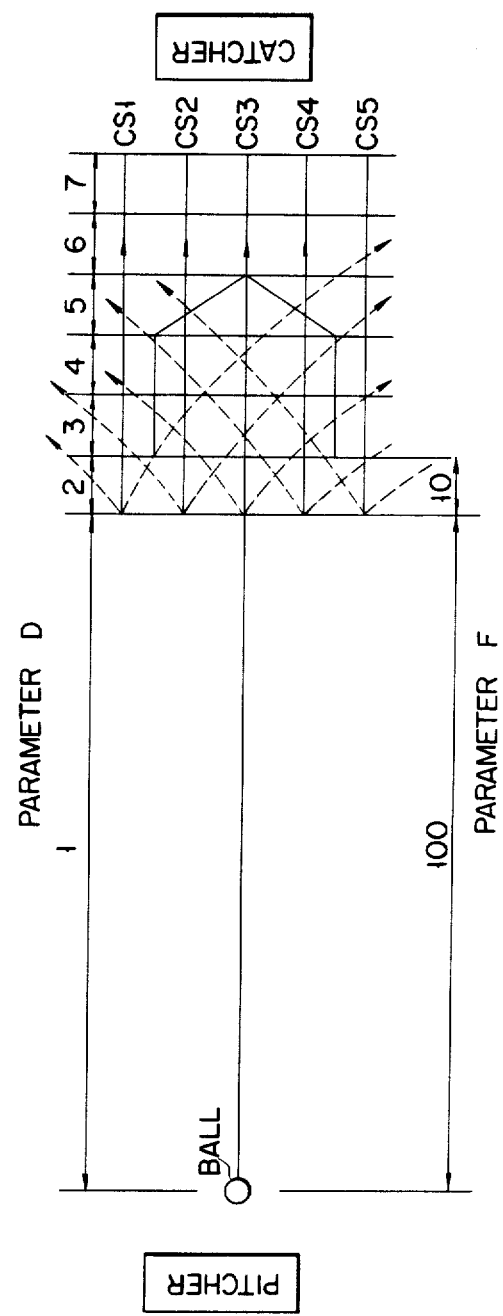
FIG. 5 is a schematic drawing showing kinds of pitching parameters and batting parameters when the embodiment in FIG. 1 is applied to a baseball game.

FIG. 5 is a schematic drawing conceptually showing kinds of pitching and batting parameters that can be entered from the key entry sections $12_1$ and $12_2$. Three parameters such as course (5 kinds), control (3 kinds), and speed (3 kinds) are used as pitching parameters. The course parameter is hereinafter indicated by letter A, control parameter by letter B, and speed parameter by letter C. Five kinds of batter positions are used at batting parameters. A bat is swung at a batter position input. The batter position parameter is indicated by letter G.

For pitching, still more parameters D, E, and F are used to determine the movement of a ball. The distance between a pitcher and a catcher is divided into seven segments 1, 2, 3, 4, 5, 6, and 7, as shown in FIG. 5, which are used as the parameter D. The segment 1 of the parameter D is divided into 100 segments, which are used as the parameter F. Each of the segments 2 to 7 of the parameter D is divided into 10 segments, which are used as the parameter E. In FIG. 5, five different courses are shown by CS1 to CS5. Three kinds of controls are available for each course as shown in FIG. 5, and each control is indicated by arrows.

Other parameters used for the program of a baseball game include: the strike indicated by letter J; ball by letter K; out by letter L; first runner by letter M; second runner by letter N; third runner by letter O; bat side score by letter P; field side score by letter Q; and change by letter R. The contents of registers and counters A to R are indicated by the same letters A to R as far as it is not ambiguous to do so.

Figure 6A:
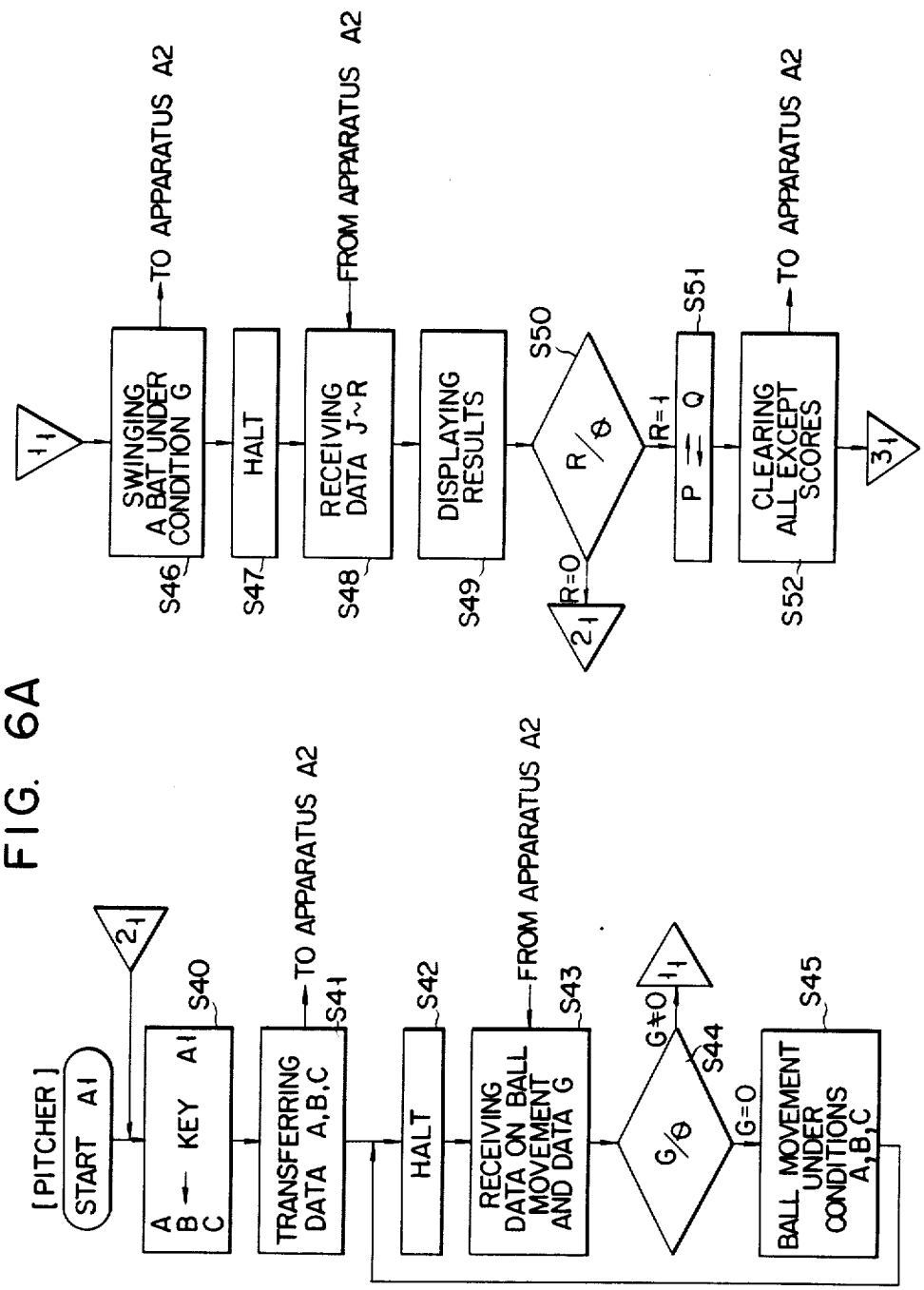
Figure 6C:
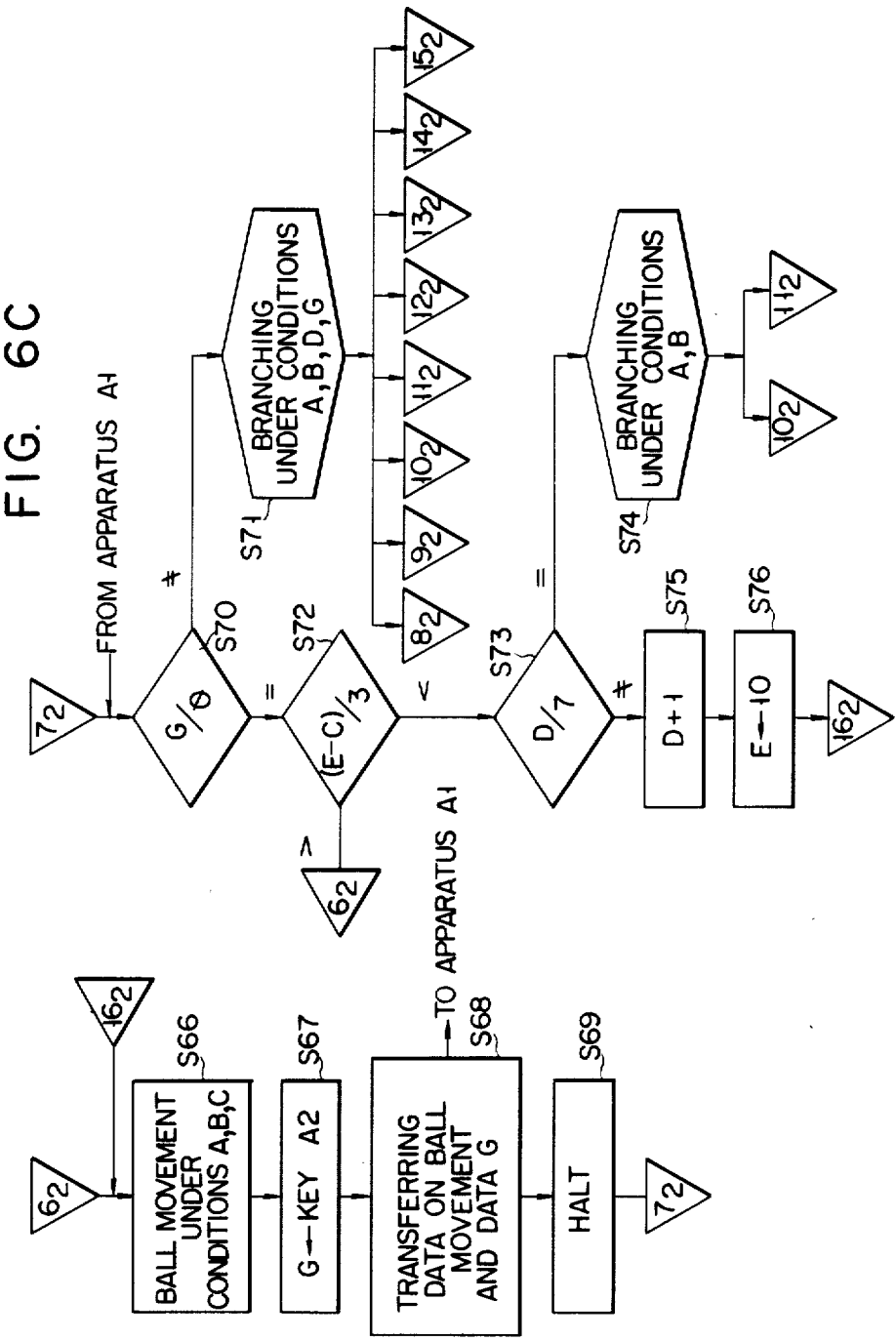
Figure 6D:
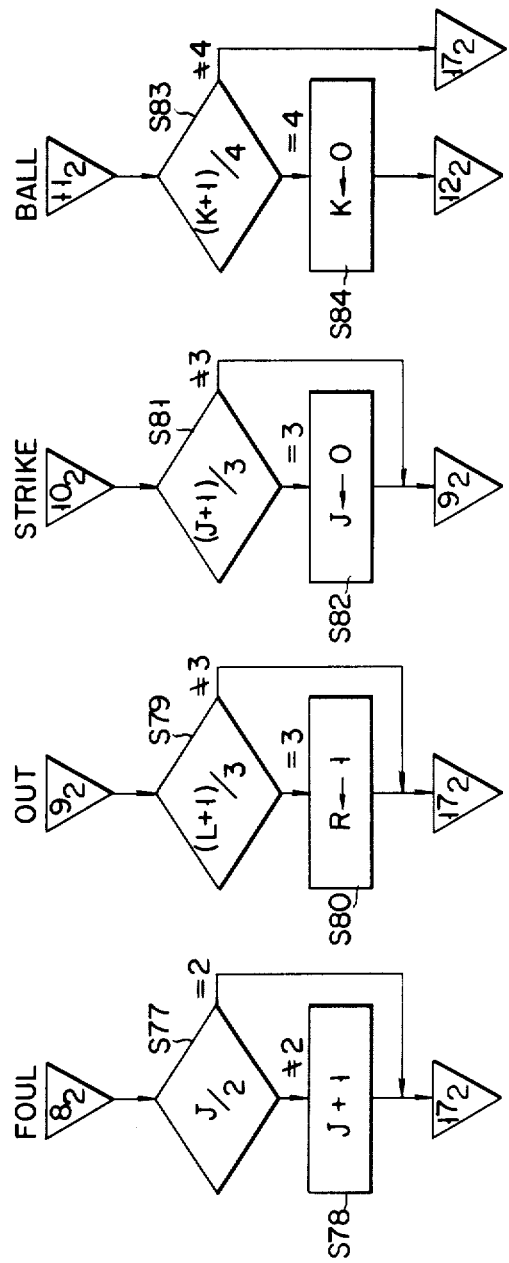
Figure 6E:
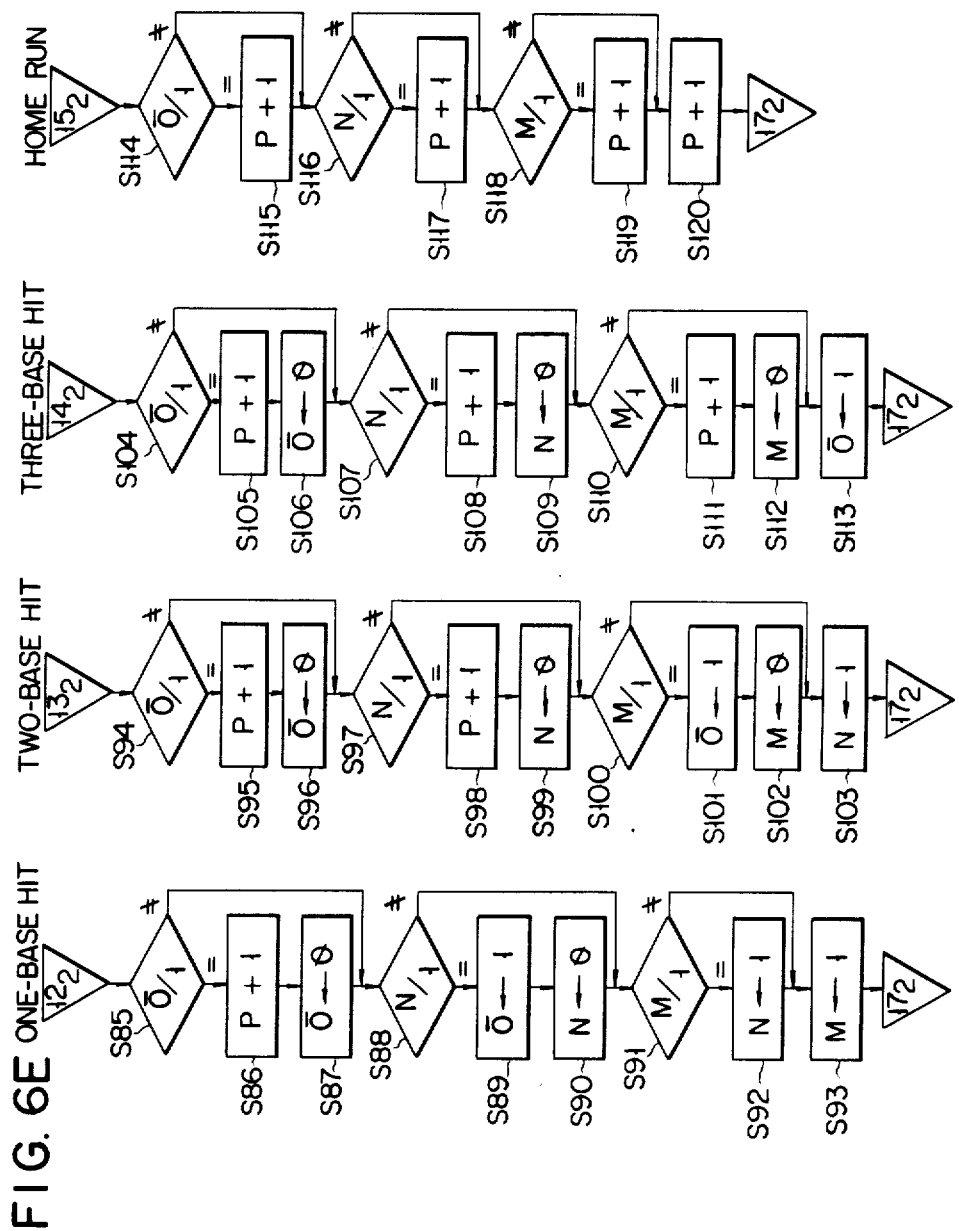
Figure 6F:
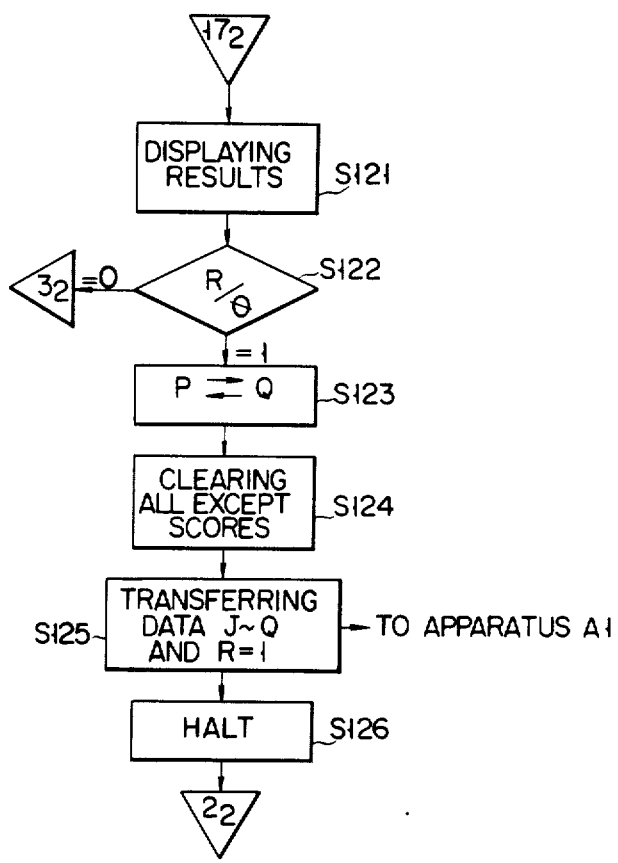

The details of the baseball game will be described with reference to the flowcharts shown in FIGS. 6A to 6F. The programs shown in FIGS. 6A to 6F have been made according to the rules of a usual baseball game. In the program memory sections $20_1$ and $20_2$ of the apparatus A1 and A2, is stored one the same programs which respectively include both the bat side routine and field side routine. For convenience of explanation, FIG. 6A shows the field side routine in the apparatus A1 and FIGS. 6B to 6F show the bat side routine in the apparatus A2. However, as mentioned above, practically, a program combining the bat and field side routines is stored in the program memory sections $20_1$ and $20_2$ of the apparatus A1 and A2, respectively.

Now let us assume the apparatus A1 is the bat side and the apparatus A2 is the field side. The parameters of a ball to be pitched are entered in the form of numerical values A, B, and C from the key entry section $12_1$ of the apparatus A1 (step S40). Then the instruction [Gosub] is sent out from the program memory section $20_1$ to the instruction decoder $14_1$, from which "1" signal is output on the signal line 32A, informing the apparatus A2 that the operation is transferred thereto. In this baseball game, since only two apparatus A1 and A2 are used, the process can be jumped to the other apparatus program by the instruction [Gosub]. As will be described later, when the instruction [Gosub] is executed in one apparatus, the program in the other apparatus is then executed from a step which is next to a halt step.

As mentioned above, when the "1" signal is output on the signal line 32A, the input/output mode switch $34_1$ switches the 3-state buffer $28_1$ to the transmission mode. Then the numerical value data for the parameters A, B, and C are transferred from the apparatus A1 to the apparatus A2 (step S41). After the data transfer is completed, the control section $10_1$ is brought to a halt state by the HALT signal output by the instruction decoder $14_1$ (step S42).

On the one hand, the operation of the field side apparatus A2 is suspended until the apparatus A1 is ready for pitching (step S54). When the data A, B, and C as parameters on pitching are transferred from the apparatus A1, the apparatus A2 receives the data (step S55). Then the apparatus A2, after setting value 100 in the counter F (step S56), delivers a ball for a single step under the conditions defined by the data A, B, and C (step S57). This delivery is displayed on the display section $36_2$ which is connected to the work memory section $24_2$ through the data bus $DB_B$. Then the batter position data entered from key entry section $12_2$ is input into the register G which stores the batter position parameter (step S58). That is, when the batter has not swung the bat yet, the data G = 0 is transferred to the apparatus A2 at step S59, while when the batter has swung the bat, a numerical data corresponding to the batter position as parameter G is transferred. At this step, the data on the delivery of the ball is also transferred. After the data transfer is completed, the apparatus A2 hands over the control to the apparatus A1 and goes in a halt state (step S60).

When the data on parameter G and the movement of the ball are transferred from the apparatus A2, then the apparatus A1 receives these data (step S43). Thus the apparatus A1 judges the state of data G (step S44); when G = 0, it decides the batter has not swung the bat yet; when G = 1, 2, 3, 4, or 5, it decides the batter has swung the bat. When G = 0, the ball is moved a single step based on the ball data A, B, and C transferred from the apparatus A2 (step S45). The move of the ball is displayed on the display section $36_1$ connected to the work memory $24_1$ through the data bus $DB_A$. Then the apparatus A1 transfers again the control to the apparatus A2 and goes in a halt state (step S42). When G≠0, the swinging of the bat is displayed under the condition G = 1, 2, 3, 4, or 5 (step S46). The the apparatus A1 transfers the control to the apparatus A2 and goes in a halt state (step S47).

When taking over the control from the apparatus A1, the apparatus A2 reads the contents of the register G and judges whether or not the batter has swung the bat (step S61). When G≠0, the swinging of the bat is done under the conditions specified by the contents of the register G (step S62). This swinging is displayed on the display section $36_1$. However, if swinging the bat when the ball is at this point, the batter will strike at the air. In this case, a processing of strike is performed (steps S81 and S82). When G = 0, the batter has not swung the bat yet, and therefore the processing only of the movement of the ball is performed. More specifically, at step S63, the contents of the register C which stores the speed parameter is subtracted from the contents of the counter F. When the value (F−C) is larger than 3, the process returns to step S57. Since the arithmetic operation (F−C) is performed at step S63, the ball moves faster when the value of speed parameter C is large than when the value of the parameter C is small. On the other hand, when the value (F−C) is less than 3, a value of 2 is set in the register D (step S64), and then a value of 10 is set in the register E (step S65). At step S64 and S65, parameter D becomes 2 indicating that the ball has moved to the next segment.

Then after the ball is moved under the conditions defined by parameters A, B, and C (step S66), the batter position data entered by the key A of the bat side apparatus A2 is set in the register G (step S67). Then after transferring the data on the move of the ball and the parameter data G to the apparatus A1 (step S68), the apparatus A2 passes the control to the apparatus A1 and goes into a halt state (step S69).

The apparatus A1 being in a halt state (step S42) goes into an operative state, performs the data processing mentioned above at steps S43 to S46, and then passes the control to the apparatus A2.

Then the apparatus A2 judges the contents of the register G at step S70: when G≠0, at step S71, it executes one of the routines for the processing of foul, out, strike, ball, one-base hit, two-base hit, three-base hit, and home run according to the conditions defined by parameters A, B, D, and G; when G = 0, it subtracts the contents of the register C from the contents of the counter E, and makes the processing go back to step S66 when the obtained value (E−C) is larger than 3. If the value (E—C) is smaller than 3, D is judged whether or not it is 7 at step S73. At this step, it is judged whether or not the ball has reached the position of the catcher while the batter has not swung the bat yet. When D = 7 (when the ball reaches the catcher) the flow of processing goes to the strike routine or ball routine based on the conditions defined by parameters A and B (step S74). When D≠7 (when the ball is still between the pitcher and the catcher), the contents of the register D is increased by 1 (step S75), and 10 is set in the counter E (step S76). At steps S75 and S76, setting numerical values is performed to change the ball position. The processing then goes back to step S66.

The foul routine judges if the contents of the register J, which stores the strike parameter, are equal to 2 (step S77); when J = 2, step S121 is executed; when J≠2, step S121 is executed after the contents of the register J is increased by 1 (step S78).

The out routine judges if value (L+1) which is obtained by increasing by 1 the contents of the register L which stores the out parameter are equal to 3 (step S79); when (L+1)≠3, step S121 is executed; when (L+1) = 3, step S121 is executed after 1 is set in the register R which stores the change parameter (step S80).

The strike routine judges if value (J+1) which is obtained by increasing by 1 the contents of the register J are equal to 3 (step S81); when (J+1)≠3, step S79 is executed; when (J+1) = 3, step S79 is executed after 0 is set in the register J (step S82).

The ball routine judges if value (K+1) which is obtained by increasing by 1 the contents of the register K which stores the ball parameter are equal to 4 (step S83); when (K+1)≠4, step S121 is executed; when (K+1) = 4, step S85 is executed after 0 is set in the register K (step S84).

The one-base-hit routine judges if the contents of the register O, which stores the third base runner parameter, are equal to 1 (step S85); when O = 0, after the contents of the register P, which stores the bat side score, are increased by 1 (step S86), 0 is set in the register O (step S87) and step S88 is executed; when O≠0, step S88 is executed. At step S88, the one-base-hit routine judges whether the contents of the register N which stores the second base runner parameter are equal to 1; when N = 1, after 1 is set in the register O (step S89), 0 is set in the register N (step S90); when N≠1, step S91 is executed. At step S91, the one-base-hit routine judges whether the contents of the register M which stores the first base runner parameter are equal to 1 (step S91); when M = 1, after 1 is set in the register N (step S92), step S93 is executed; when M≠1, step S93 is executed. At step S93, after 1 is set in the register M, step S121 is executed.

The two-base-hit routine judges whether the contents of the register O are equal to 1 (step S94); when O = 0, after the contents of the register P are increased by 1 (step S95), 1 is set in the register O (step S96) and step S97 is executed; when O≠1, step S97 is executed. At step S97, this routine judges whether the contents of the register N are equal to 1; when N=1, after the contents of the register P are increased by 1 (step S98), 0 is set in the register N (step S99) and step S100 is executed; when N≠1, step S100 is executed. At step S100, this routine judges whether the contents of the register M are equal to 1; when M=1, after "1" is set in the register O (step S101), "0" is set in the register M (step S102) and step S103 is executed; when M≠1, step S103 is executed. At step S103, "1" is set in the register N (step S103) and step S121 is executed.

The three-base-hit routine judges whether the contents of the register O are equal to 0 (step S104); when O=1, after the contents of the register P are increased by 1 (step S105), "0" is set in the register O (step S106) and step S107 is executed; when O≠1, step S107 is executed. At step S107, this routine judges whether the contents of the register N are equal to 1; when N=1, after the contents of the register P are increased by 1 (step S108), 0 is set in the register N (step S109) and step S110 is executed; when N≠1, step S110 is executed. At step S110, this routine judges whether the contents of the register M are equal to 1; when M=1, after the contents of the register P are increased by 1 (step S111), "0" is set in the register M (step S112) and step S113 is executed; when M≠1, step S113 is executed. At step S113, after "1" is set in the register O, step S121 is executed.

The home run routine judges whether the contents of the register O are equal to 1 (step S114); when O=1, after the contents of the register P are increased by 1 (step S115), step S116 is executed; when O≠1, step S116 is executed. At step S116, this routine judges whether the contents of the register N are equal to 1; when N=1, after the contents of the register P are increased by 1 (step S117), step S118 is executed; when N≠1, step S118 is executed. At step S118, this routine judges whether the contents of the register M are equal to 1; when M=1, after the contents of the register P are increased by 1 (step S119), step S120 is executed; when M≠1, step S120 is executed. At step S120, after the contents of the register P are increased by 1, step S121 is executed.

At step S121, those results required to be displayed among the results of the above-mentioned various processings are displayed on the display section $36_2$. The contents of the register R are checked whether they are 0, and when R=1, after the contents of the register P of the bat side score, those of the register Q which stores the field side score parameter are exchanged (step S123), the contents of all the registers except one for the scores are cleared (step S124). Then after the data on the contents of registers J to Q and data R=1 are transferred to the apparatus A1 (step S125), the apparatus A1 hands over the control to the apparatus A2 and goes in a halt state (step S126).

The apparatus A1, which has been in a halt state (step S47), receives data J to R sent from the apparatus A2 (step S48), goes in an operative state, and displays necessary data among the data J to R on the display section $36_1$ (step S49). However in this case, since all data except the scores has been already cleared by the apparatus A2, the display on the apparatus A1 is the same as that on display section $36_2$ of the apparatus A2. Then R is judged whether it is equal to 1 or 0 (step S50). At this point of time, since R=1, after P and Q are exchanged (step S51), the registers except one for the scores are cleared (step S52). By the completion of the exchange processing, the field routine is completed, and then the bat routine is executed.

The bat routine of the apparatus A1 is the same as that of the apparatus A2 shown in FIGS. 6B to 6F. Therefore, the apparatus A1 executes step S52, transfers data J to R to the apparatus A2, and then hands over the control to the apparatus A2. After these processings, the apparatus A1 goes into a halt state.

The apparatus A2 which has been in a halt state at step S126 completes the field routine and executes the bat routine. The bat routine of the apparatus A2 is the same as that of the apparatus A1 shown in FIG. 6A. Therefore, after the apparatus A2 is brought to an operative state at step S126, data A, B, and C on the delivery of the ball are entered from the key entry section $12_2$ and the field routine is executed.

Thus in the baseball game mentioned above, the field routine of the apparatus A1 uses the bat routine of the apparatus A2 and vice versa. Similarly, the field routine of the apparatus A2 uses the bat routine of the apparatus A1 and vice versa. Therefore, since the player at the bat side and the player at the field side need not alternatively operate keys as in conventional baseball game machines, the present game will bring about lots of fun in a manner closer to an actual baseball game.

The baseball game described above is an application embodying the present invention. The present invention is not limited to this application. For example, the invention may be applied to a card game played by two or more players.

The present invention is not limited to the embodiments described herein, but may be extended to various changes and modifications within the spirit and scope of the present invention.

What is claimed is:
1. An electronic game apparatus, comprising:
a keyboard section for entering data;
memory means for storing a game program;
processing means for decoding continuously the game program stored in said memory means according to the data entered from said keyboard section to implement game control data;
display means for displaying a condition representative of the game control data as implemented by said processing means;
interconnect means connected to said processing means for interconnecting the electronic game apparatus with two or more other like electronic game apparatus;
said processing means being coupled to said interconnect means and operating to control operations in the other like electronic game apparatus;
said processing means including signal transmission control means for sending control signals to the other like electronic game apparatus through said interconnect means based on decoding a signal transmission command in the game control data stored in said memory means, and for releasing the other like electronic game apparatus from a standby mode and transmitting data to the other like electronic game apparatus through said interconnect means; and signal reception control means for releasing the like electrical game apparatus from a standby mode when a control signal is inputted from the other like electronic game apparatus through said interconnect means, and for writing into said memory means data transmitted from the other like electronic game apparatus through said interconnect means;

said interconnect means consisting of a first pair of signal lines coupled to said processing means so that one of said first pair sends a control signal to another like electronic game apparatus and the other signal line of said first pair sends a control signal to still another like electronic game apparatus when said signal transmission control means decodes said signal transmission command, and a second pair of signal lines coupled to said processing means so that one of said second pair receives said control signal from said other like electronic game apparatus and the other signal line of said second pair receives said control signal from said still another like electronic game apparatus when said signal reception control means decodes a signal reception command; and a data bus line for transmitting data to the other like electronic game apparatus and for inputting data from the other like electronic game apparatus; and a connection circuit for connecting said first and second pairs of signal lines and said data bus line with said processing means;

said connection circuit of said interconnect means including a data transmission circuit for transmitting data from said processing means to the other like electronic game apparatus through said data bus line when said transmission control means operates, and for receiving data transmitted from the other like electronic game apparatus through said data bus line when said reception control means operates.

* * * * *